United States Patent [19]

Oroskar

[11] Patent Number: 4,498,991

[45] Date of Patent: Feb. 12, 1985

[54] SERIAL FLOW CONTINUOUS SEPARATION PROCESS

[75] Inventor: Anil R. Oroskar, Brookfield, Ill.

[73] Assignee: UOP Inc., Des Plaines, Ill.

[21] Appl. No.: 622,031

[22] Filed: Jun. 18, 1984

[51] Int. Cl.³ .............................................. B01D 15/08
[52] U.S. Cl. ........................................ 210/659; 55/67; 55/74; 127/46.1; 210/672; 210/677
[58] Field of Search ...................... 55/67, 74, 197, 387; 127/46.1, 46.2, 46.3; 210/659, 672, 676, 677, 210/691

[56] References Cited

U.S. PATENT DOCUMENTS

| | | | |
|---|---|---|---|
| 2,985,589 | 5/1961 | Broughton et al. | 210/34 |
| 3,040,777 | 6/1962 | Carson et al. | 137/625 |
| 3,205,166 | 9/1965 | Ludlow et al. | 208/310 |
| 3,291,726 | 12/1966 | Broughton | 208/310 |
| 3,310,486 | 3/1967 | Broughton et al. | 208/310 |
| 3,416,961 | 12/1968 | Mountfort et al. | 127/46 |
| 3,422,848 | 1/1969 | Liebman et al. | 137/625 |
| 3,455,815 | 7/1969 | Fickel | 208/310 |
| 3,686,117 | 8/1972 | Lauer et al. | 210/31 C |
| 3,715,409 | 2/1973 | Broughton | 260/674 SA |
| 4,022,637 | 5/1977 | Sutthoff et al. | 127/46 A |
| 4,031,155 | 6/1977 | Healy et al. | 260/674 SA |
| 4,155,846 | 5/1979 | Novak et al. | 210/31 C |
| 4,157,267 | 6/1979 | Odawara et al. | 127/46 A |
| 4,267,054 | 5/1981 | Yoritomi et al. | 210/659 |
| 4,332,623 | 6/1982 | Ando et al. | 127/462 |
| 4,402,832 | 9/1983 | Gerhold | 210/659 |

OTHER PUBLICATIONS

Japanese Public Disclosure 118400/80 (Public Disclosure Date Sep. 11, 1980), of Miyahara et al.

Primary Examiner—Ivars Cintins
Attorney, Agent, or Firm—William H. Page, II; Louis A. Morris

[57] ABSTRACT

A process for separating an extract component from a raffinate component contained in a feed mixture. A unidirectional fluid flow system is maintained through a series of separating units through which the components travel at different rates. The units are interconnected in series so as to form a single closed loop. A component concentration distribution is established within the system of units so as to comprise a series of zones. Feed and displacement fluid are each mixed with a different intercolumn stream prior to being passed into the inlets of two of the units and extract and raffinate are taken only as portions of streams from outlets of two or more of the units at appropriate points on the component concentration distribution. At the appropriate times the inlets and outlets are shifted so as to simulate movement of the units in a direction downstream with respect to the direction of fluid flow and thereby enable the inlets and outlets to continually lie in the appropriate zones.

6 Claims, 12 Drawing Figures

SERIAL FLOW CONTINUOUS SEPARATION PROCESS

BACKGROUND OF THE INVENTION

1. Field of the Invention

The field of art to which this invention pertains is the separation of a component from a fluid mixture of components.

2. Background Information

There are many separation processes known for separating components from a fluid mixture. Fractional distillation or crystallization are examples of means ideal for separating liquid mixtures of components having different boiling points or freezing points, respectively. Gas or liquid chromatography makes use of material or adsorbents having varying degrees of affinity for different components of a fluid mixture, thereby causing the components to separate as they flow through the material. Similarly, materials known as molecular sieves may affect the rates at which each component of a fluid mixture passes through them by admitting only molecules of certain of the components into the pore structure of the material, but not other components, thus the component for which the material in question has the greater affinity or retention capacity may be recovered or "desorbed" by means of a desorbent material.

A very successful process for separating components from a feed mixture based on the use of adsorbents or molecular sieves for chromatographic type separations is the countercurrent moving-bed or simulated moving-bed countercurrent flow system. In the moving-bed or simulated moving-bed processes the adsorption and desorption operations are continuously taking place which allows both continuous production of an extract (more selectively adsorbed component) and a raffinate (less selectively adsorbed component) stream and the continual use of feed and desorbent streams. The operating principles and sequence of such a flow system are described in U.S. Pat. No. 2,985,589 to Broughton et al. In that system it is the progressive movement of multiple liquid access points down an adsorbent chamber that simulates the upward movement of adsorbent contained in the chamber. Only four of the access lines are active at any one time: the feed input stream, desorbent inlet stream, raffinate outlet stream, and extract outlet stream access lines. Coincident with this simulated upward movement of the solid adsorbent is the movement of the liquid occupying the void volume of the packed bed of adsorbent. So that countercurrent contact is maintained, a liquid flow down the adsorbent chamber may be provided by a pump. As an active liquid access point moves through a cycle, that is, from the top of the chamber to the bottom, the chamber circulation pump moves through different zones which require different flow rates. A programmed flow controller may be provided to set and regulate these flow rates.

The active liquid access points effectively divide the adsorbent chamber into separate zones, each of which has a different function. It is generally necessary that three separate operational zones be present in order for the process to take place although in some instances an optional fourth zone may be used.

The adsorption zone, zone 1, is defined as the adsorbent located between the feed inlet stream and the raffinate outlet stream. In this zone, the feed stock contacts the adsorbent, an extract component is adsorbed, and a raffinate stream is withdrawn. Since the general flow through zone 1 is from the feed stream which passes into the zone to the raffinate stream which passes out of the zone, the flow in this zone is considered to be a downstream direction when proceeding from the feed inlet to the raffinate outlet streams.

Immediately upstream with respect to fluid flow in zone 1 is the purification zone, zone 2. The purification zone is defined as the adsorbent between the extract outlet stream and the feed inlet stream. The basic operations taking place in zone 2 are the displacement from the non-selective void volume of the adsorbent of any raffinate material carried into zone 2 by the shifting of adsorbent into this zone and the desorption of any raffinate material adsorbed within the selective pore volume of the adsorbent or adsorbed on the surfaces of the adsorbent particles. Purification is achieved by passing a portion of extract stream material leaving zone 3 into zone 2 at zone 2's upstream boundary, the extract outlet stream, to effect the displacement of raffinate material. The flow of material in zone 2 is in a downstream direction from the extract outlet stream to the feed inlet stream.

Immediately upstream of zone 2 with respect to the fluid flowing in zone 2 is the desorption zone or zone 3. The desorption zone is defined as the adsorbent between the desorbent inlet and the extract outlet stream. The function of the desorption zone is to allow a desorbent material which passes into this zone to displace the extract component which was adsorbed upon the adsorbent during a previous contact with feed in zone 1 in a prior cycle of operation. The flow of fluid in zone 3 is essentially in the same direction as that of zones 1 and 2.

In some instances an optional buffer zone, zone 4, is utilized. This zone, defined as the adsorbent between the raffinate outlet stream and the desorbent inlet stream, if used, is located immediately upstream with respect to the fluid flow to zone 3. Zone 4 would be utilized to conserve the amount of desorbent utilized in the desorption step since a portion of the raffinate stream which is removed from zone 1 can be passed into zone 4 to displace desorbent material present in that zone out of that zone into the desorption zone. Zone 4 will contain enough adsorbent so that raffinate material present in the raffinate stream passing out of zone 1 and into zone 4 can be prevented from passing into zone 3 thereby contaminating extract stream removed from zone 3. In the instances in which the fourth operational zone is not utilized the raffinate stream passed from zone 1 to zone 4 must be carefully monitored in order that the flow directly from zone 1 to zone 3 can be stopped when there is an appreciable quantity of raffinate material present in the raffinate stream passing from zone 1 into zone 3 so that the extract outlet stream is not contaminated.

A cyclic advancement of the input and output streams through the fixed bed of adsorbent can be accomplished by utilizing a manifold system in which the valves in the manifold are operated in a sequential manner to effect the shifting of the input and output streams thereby allowing a flow of fluid with respect to solid adsorbent in a countercurrent manner. Another mode of operation which can effect the countercurrent flow of solid adsorbent with respect to fluid involves the use of a rotating disc valve in which the input and output streams are connected to the valve and the lines through which feed input, extract output, desorbent input and raffinate output streams pass are advanced in the same direction through the adsorbent bed. Both the manifold arrangement and disc valve are known in the art. Specifically rotary disc valves which can be utilized in this prior art operation can be found in U.S. Pat. Nos. 3,040,777 to Carson et al. and 3,422,848 to Liebman et al. Both of the aforementioned patents disclose a rotary type connection valve in which the suitable advancement of the various input and output streams from fixed sources can be achieved without difficulty.

In many instances, one operational zone will contain a much larger quantity of adsorbent than some other operational zone. For instance, in some operations the buffer zone can contain a minor amount of adsorbent as compared to the adsorbent required for the adsorption and purification zones. It can also be seen that in instances in which desorbent is used which can easily desorb extract material from the adsorbent that a relatively small amount of adsorbent will be needed in a desorption zone as compared to the adsorbent needed in the buffer zone or adsorption zone or purification zone or all of them. Since it is not required that the adsorbent be located in a single column, the use of multiple chambers or a series of columns is within the scope of the process.

It is not necessary that all of the input or output streams be simultaneously used, and in fact, in many instances some of the streams can be shut off while others effect an input or output of material. The apparatus which can be utilized to effect this prior art process can also contain a series of individual beds connected by connecting conduits upon which are placed input or output taps to which the various input or output streams can be attached and alternately and periodically shifted to effect continuous operation. In some instances, the connecting conduits can be connected to transfer taps which during the normal operations do not function as a conduit through which material passes into or out of the process.

It is usually essential to the prior art simulated moving-bed process that at least a portion of the extract output stream will pass into a separation means wherein at least a portion of the desorbent material can be separated to produce an extract product containing a reduced concentration of desorbent material. Preferably at least a portion of the raffinate output stream will also be passed to a separation means wherein at least a portion of the desorbent material can be separated to produce a desorbent stream which can be reused in the process and a raffinate product containing a reduced concentration of desorbent material. The separation means will typically be a fractionation column, the design and operation of which is well known to the separation art.

Further reference can be made to D. B. Broughton U.S. Pat. No. 2,985,589, and to a paper entitled "Continuous Adsorptive Processing—A New Separation Technique" by D. B. Broughton presented at the 34th Annual meeting of the Society of Chemical Engineers at Tokyo, Japan on Apr. 2, 1969, for further explanation of the simulated moving-bed countercurrent process flow scheme.

There have been other flow schemes since the above basic Broughton et al. invention which are also based in some manner on chromatographic separation of feed stream components through the establishment of a concentration gradient of such components in a bed or beds of adsorbent material exhibiting adsorptive selectivity for one component over another. For example, Japanese Public Disclosure 118400/80 (Public Disclosure Date Sept. 11, 1980) of Miyahara et al. discloses the use of a single (nonsimulated moving-bed) column of ion-exchange resin with an inlet at the top and an outlet at the bottom for the separation of glucose from fructose by sequentially passing into the column, in the appropriate order, the feed stream, the desorbent stream and various effluent streams held in intermediate storage, each stream being introduced at the appropriate time with relation to the concentration gradient in the column. Similarly, in the process of U.S. Pat. No. 4,267,054 to Yoritomi et al. a concentration gradient is established in one or more columns (simulated moving-bed) with the discontinuous and intermittent introduction of the feed and desorbent streams which cause disturbance of the gradient and the introduction of various recycle streams direct from the column effluent (rather than intermediate storage) as appropriate to reestablish the concentration gradient. Other examples of processes involving flow schemes similar to any of the above art, but no more relevant to the present invention, are as set forth in U.S. Pat. Nos. 3,205,166 to Ludlow et al. (actual moving bed); 3,291,726 to Broughton; 3,310,486 to Broughton et al; 3,416,961 to Mountfort et al; 3,455,815 to Fickel; 3,686,117 to Lauer et al; 3,715,409 to Broughton; 4,155,846 to Novak et al; 4,157,267 to Odawara et al; 4,022,637 to Sutthoff et al; 4,031,155 to Healy et al; and 4,332,623 to Ando et al.

The process which should probably be considered closest to that of the present invention is that disclosed in U.S. Pat. No. 4,402,832 to Gerhold. Gerhold comprises a process for separating an extract component from a raffinate component contained in a feed mixture comprising the steps of: (a) maintaining a unidirectional fluid flow system through a series of separating units in which the components have differential rates of travel due to selective retention or acceleration of the components in each of the units, each of the units having a fluid inlet and a fluid outlet; (b) passing the feed mixture into one of the fluid inlets and a displacement fluid into another of the fluid inlets, the displacement fluid being capable of displacing the components from the separating units; (c) establishing within a system comprising the fluid flow system a component concentration distribution, zones of which comprise, sequentially, the highest purity displacement fluid (zone I), extract component diluted with displacement fluid (zone II), concentrated extract component (zone III), extract and raffinate component mixture with the extract component being the major component (zone IV), extract and raffinate component mixture with the raffinate component being the major component (zone V), concentrated raffinate component (zone VI), and raffinate component diluted with displacement fluid (zone VII), each of the zones II, IV, V and VII having associated with it one of the fluid inlets and one of the fluid outlets, zone I having the fluid inlet for displacement fluid associated with it and each of zones III and VI having associated with it a fluid outlet, the feed mixture being passed through a fluid inlet the locus of which is at least proximate to the point on the component concentration distribution where the relative proportions of the extract and raffinate components are the same as that occurring in the feed mixture; (d) withdrawing an extract stream comprising the entire flow from the fluid outlet of zone III, and withdrawing a raffinate stream comprising the entire flow from the fluid outlet of zone VI; (e) passing the entire stream from each of the fluid outlets of the zones II, IV, V and VII to a corresponding fluid inlet, the locuses of each outlet and corresponding inlet being within the same zone of the component concentration distribution; and (f) periodically simultaneously effecting the following shifting of the inlets and outlets: the feed mixture fluid inlet to what prior to the shift was the inlet of zone V, the inlet of zone V to what had been the inlet of zone VII, the inlet of zone VII to what had been the inlet of zone I, the inlet of zone I to what had been the inlet of zone II, the inlet of zone II to what had been the inlet of zone IV, the inlet of zone IV to what had been the feed mixture inlet, the outlet of zone II to what had been the outlet of zone III, the outlet of zone III to what had been the outlet of zone IV, the outlet of zone IV to what had been the outlet of zone V, the outlet of zone V to what had been the outlet of zone VI, the outlet of zone VI to what had been the outlet of zone VII, and the outlet of zone VII to what had been the outlet of zone II, the shifting being effected prior to the progression through the units of the component concentration distribution to the extent that the composition of the inlet or outlet streams to or from any zone becomes inconsistent with the desired composition of that zone.

Gerhold, thus, in contradistinction to the above discussed art, achieves chromatographic separation of components of a feed mixture by the employment of a simulated moving-bed cocurrent flow system without, inter alia, the purification or buffering zones such as in Broughton et al. (U.S. Pat. No. 2,985,589), the intermediate storage such as in Miyahara et al. or the discontinuous and intermittent characteristics such as in Yoritomi et al. In Gerhold, six discrete separating units, as compared to the continuous adsorbent bed of the Broughton et al. process, enable the individual bed fluid compositions to keep pace with the progression of the concentration gradients and there is no need to flush, purify or buffer a given bed prior to it shifting into a particular zone because that bed will already have acquired the appropriate composition.

The present invention is distinguished from the above discussed art, except Gerhold, in the same manner as Gerhold as set forth above. The present invention, however, constitutes a radical departure from the most basic precepts of Gerhold as will be discussed hereinbelow. Although the present invention is considered in certain respects to have advantages over Gerhold, it is not intended that it in any way detract from the immense advance in the separation art achieved by Gerhold.

SUMMARY OF THE INVENTION

The present invention, in its broadest embodiment, comprises a process for separating an extract component from a raffinate component contained in a feed mixture comprising the steps of (a) maintaining a unidirectional fluid flow system through a series of separating units in which the components have differential rates of travel due to selective retardation or acceleration of each of the components in each of the units, each of the units having a fluid inlet and a fluid outlet, the separating units being interconnected so as to achieve serial flow through the units in a single closed loop; (b) mixing the feed mixture with the fluid emanating from one of the fluid outlets and passing the resultant first mixture into the next inlet downstream of that outlet in the series and mixing the displacement fluid with the fluid emanating from another of the fluid outlets and passing the resultant second mixture into the next inlet downstream of the other outlet in the series; (c) establishing within the separating units a component concentration distribution, zones of which comprise, sequentially, progressing in the direction of fluid flow, extract and raffinate component mixture with the proportion of the raffinate component to extract component being greater than in the feed mixture, extract and raffinate component mixture with the proportion of extract component to raffinate component being greater than in the feed mixture, concentrated extract component, extract component diluted with displacement fluid, raffinate component diluted with displacement fluid, and concentrated raffinate component; (d) withdrawing as an extract product stream a portion of at least one of the streams between an adjacent pair of separating units, and withdrawing as a raffinate product stream a portion of at least one other of the streams between a different adjacent pair of separating units, the selection of the streams from which the product streams are withdrawn being consistent with the desired composition of each of said product streams; (e) periodically simultaneously advancing in an upstream direction with respect to fluid flow in the separating units, all of the inlets and outlets to effect the shifting of zones in a downstream direction with respect to the fluid flow, the shifting being effected prior to the progression through the units of the component concentration distribution to the extent that the composition of the inlet or outlet streams to or from any zone becomes inconsistent with the desired composition of that zone.

Other embodiments of the invention relate to flow rates, conditions and process details as well as the specific configurations of the flow scheme of the present invention.

DETAILED DESCRIPTION OF THE INVENTION

Figure 1:
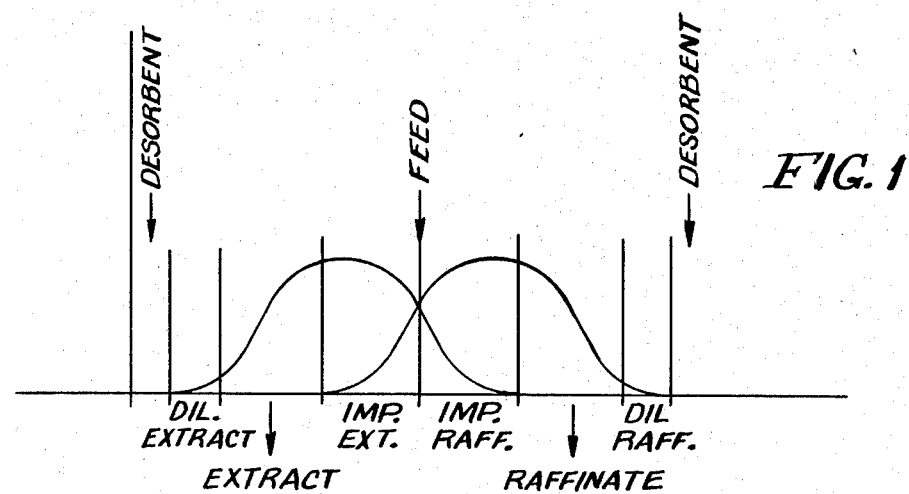
FIG. 1 is a plot of concentration gradients on which the present invention is based.

At the onset it is desirous to point out that it is contemplated that the present invention would be efficacious regardless of the separating means employed. The only general limitations are that the flow streams are fluid and that in fact a separation is accomplished by the separating unit in question. Thus, the separating units might comprise, for example, units in which the selected component acceleration or retardation results from partial vaporization, selective dialysis, electrophoresis, selective diffusion, or passage through beds of molecular sieves or other selective adsorbents. For the sake of convenience, it is the last mentioned separation means that will be emphasized for purposes of the following discussion, although it should be understood that the present invention is not limited to the use of such means and that the various components of the adsorptive separation means has functional parallels in other means. Contact of the feed mixture with the adsorbent will occur at adsorption conditions and contact with the desorbent at desorption conditions, all such conditions preferably comprising temperatures and pressures which effect liquid phase.

The definitions of various terms used throughout the specification will be useful. A "feed mixture" is a mixture containing one or more extract components and one or more raffinate components to be separated by my process. The term "feed stream" indicates a stream of a feed mixture which passes to the adsorbent used in the process. An "extract component" is a component which, because it is adsorbed, moves more slowly through the system, while a "raffinate component" is a component which because it is less selectively adsorbed, moves more rapidly through the system. The term "desorbent material" shall mean generally a displacement fluid capable of desorbing and displacing both the extract and raffinate components, but at different rates. The term "desorbent stream" or "desorbent input stream" indicates the stream through which desorbent material passes to the system. The term "raffinate stream" or "raffinate output stream" means a stream through which a raffinate component is removed from the system. The term "extract stream" or "extract output stream" shall mean a stream through which an extract material which has been desorbed by a desorbent material is removed from the system. Practically speaking, the extract and raffinate output streams will be diluted to some extent by the desorbent material, although significantly less than the dilution which occurs in the process of the above U.S. Pat. No. 2,985,589 to Broughton, et al. Final separation, therefore, usually requires steps for removal and recovery of the desorbent material from each of the separated product streams.

The term "selective pore volume" of the adsorbent is defined as the volume of the adsorbent which selectively adsorbs an extract component from the feed mixture. The term "non-selective void volume" of the adsorbent is the volume of the adsorbent which does not selectively retain an extract component from the feed mixture. This volume includes the cavities of the adsorbent which contain no adsorptive sites and the interstitial void spaces between adsorbent particles. The selective pore volume and the non-selective void volume are generally expressed in volumetric quantities and are of importance in determining the proper flow rates of fluid required to be passed into a zone for efficient operations to take place for a given quantity of adsorbent. When adsorbent "passes" into a zone (hereinafter defined and described), its non-selective void volume, together with its selective pore volume, carries fluid into that zone. The selective pore volume of an adsorbent can in certain instances adsorb portions of raffinate material from the fluid surrounding the adsorbent, since in certain instances there is competition between extract material and raffinate material for adsorptive sites within the selective pore volume. If a large quantity of raffinate material with respect to extract material surrounds the adsorbent, raffinate material can be competitive enough to be adsorbed by the adsorbent.

Desorbent materials used in various prior art adsorptive separation processes vary depending upon such factors as the type of operation employed. In the swing-bed system, in which the selectively adsorbed feed component is removed from the adsorbent by a purge stream, desorbent selection is not as critical and desorbent material comprising gaseous hydrocarbons such as methane, ethane, etc., or other types of gases such as nitrogen or hydrogen, may be used at elevated temperatures or reduced pressures or both to effectively purge the adsorbed feed component from the adsorbent, if the adsorbed feed component is volatile. However, in adsorptive separation processes which are generally operated continuously at substantially constant pressures and temperatures to ensure liquid phase, the desorbent material must be judiciously selected to satisfy many criteria. First, the desorbent material should displace an extract component from the adsorbent with reasonable mass flow rates without itself being so strongly adsorbed as to unduly prevent an extract component from displacing the desorbent material in a following adsorption cycle. Expressed in terms of the selectivity (hereinafter discussed in more detail), it is preferred that the adsorbent be more selective for all of the extract components with respect to a raffinate component than it is for the desorbent material with respect to a raffinate component. Secondly, desorbent materials must be compatible with the particular adsorbent and the particular feed mixture. More specifically, they must not reduce or destroy the critical selectivity of the adsorbent for an extract component with respect to a raffinate component. Additionally, desorbent materials should not chemically react with or cause a chemical reaction of either an extract component or a raffinate component. Both the extract stream and the raffinate stream are typically removed from the adsorbent in admixture with desorbent material and any chemical reaction involving a desorbent material and an extract component or a raffinate component would reduce the purity of the extract product or the raffinate product or both. Since both the raffinate stream and the extract stream typically contain desorbent materials, desorbent materials should additionally be substances which are easily separable from the feed mixture that is passed into the process. Without a method of separating at least a portion of the desorbent material present in the extract stream and the raffinate stream, the concentration of an extract component in the extract product and the concentration of a raffinate component in the raffinate product might not be as high as desired, nor would the desorbent material be available for reuse in the process. It is contemplated that at least a portion of the desorbent material might be separated from the extract and the raffinate streams by distillation or evaporation, but other separation methods such as reverse osmosis may also be employed alone or in combination with distillation or evaporation. If the raffinate and extract products are foodstuffs intended for human consumption, desorbent materials should also be non-toxic. Finally, desorbent materials should also be materials which are readily available and therefore reasonable in cost.

The prior art has recognized that certain characteristics of adsorbents are highly desirable, if not absolutely necessary, to the successful operation of a selective adsorption process. Such characteristics are equally important to the embodiment of this process illustrated. Among such characteristics are: adsorptive capacity for some volume of an extract component per volume of adsorbent; the selective adsorption of an extract component with respect to a raffinate component and the desorbent material; and sufficiently fast rates of adsorption and desorption of an extract component to and from the adsorbent. Capacity of the adsorbent for adsorbing a specific volume of an extract component is, of course, a necessity; without such capacity the adsorbent is useless for adsorptive separation. Furthermore, the higher the adsorbent's capacity for an extract component, the better is the adsorbent. Increased capacity of a particular adsorbent makes it possible to reduce the amount of adsorbent needed to separate an extract component of known concentration contained in a particular charge rate of feed mixture. A reduction in the amount of adsorbent required for a specific adsorptive separation reduces the cost of the separation process. It is important that the good initial capacity of the adsorbent be maintained during actual use in the separation process over some economically desirable life. The second necessary adsorbent characteristic is the ability of the adsorbent to separate components of the feed; or, in other words, that the adsorbent possess adsorptive selectivity,(B), for one component as compared to another component. Relative selectivity can be expressed not only for one feed component as compared to another but can also be expressed between any feed mixture component and the desorbent material. The selectivity, (B), as used throughout this specification is defined as the ratio of the two components of the adsorbed phase over the ratio of the same two components in the unadsorbed phase at equilibrium conditions. Relative selectivity is shown as Equation 1 below:

$$\text{Selectivity} = (B) = \frac{[\text{vol. percent } C/\text{vol. percent } D]_A}{[\text{vol. percent } C/\text{vol. percent } D]_U} \quad \text{Equation 1}$$

where C and D are two components of the feed represented in volume percent and the subscripts A and U represent the adsorbed and unadsorbed phases respectively. The equilibrium conditions are determined when the feed passing over a bed of adsorbent did not change composition after contacting the bed of adsorbent. In other words, there is no net transfer of material occurring between the unadsorbed and adsorbed phases. Where selectivity of two components approaches 1.0, there is no preferential adsorption of one component by the adsorbent with respect to the other; they are both adsorbed (or non-adsorbed) to about the same degree with respect to each other. As the (B) becomes less than or greater than 1.0, there is a preferential adsorption by the adsorbent for one component with respect to the other. When comparing the selectivity by the adsorbent of one component C over component D, a (B) larger than 1.0 indicates preferential adsorption of component C within the adsorbent. A (B) less than 1.0 would indicate that component D is preferentially adsorbed leaving an unadsorbed phase richer in component C and an adsorbed phase richer in component D. Ideally, desorbent materials should have a selectivity equal to about 1 or slightly less than 1 with respect to all extract components so that all of the extract components can be desorbed as a class with reasonable flow rates of desorbent material and so that extract components can displace desorbent material in a subsequent adsorption step. While separation of an extract component from a raffinate component is theoretically possible when the selectivity of the adsorbent for the extract component with respect to the raffinate component is greater than 1.0, it is preferred that such selectivity be greater than 2.0. Like relative volatility, the higher the selectivity the easier the separation is to perform. Higher selectivities permit a smaller amount of adsorbent to be used. The third important characteristic is the rate of exchange of the extract component of the feed mixture material or, in other words, the relative rate of desorption of the extract component. This characteristic relates directly to the amount of desorbent material that must be employed in the process to recover the extract component from the adsorbent; faster rates of exchange reduce the amount of desorbent material needed to remove the extract component and therefore permit a reduction in the operating cost of the process. With faster rates of exchange, less desorbent material has to be pumped through the process and separated from the extract stream for reuse in the process.

With the above background information, attention may now be directed specifically to the present invention. With reference to FIG. 1, there is shown a plot of two overlapping curves, one, as indicated, being the concentration gradient of a relatively retained component through the system (hereinafter defined) and the second, as indicated, being the corresponding concentration gradient for the relatively non-retained or acceleration component. The retention or acceleration results, depending on the separation means in question, from the selective adsorption, volatility, diffusion or reaction to externally applied fields of the various components. The ordinate of the plot represents the magnitude of the concentration of a component at a point in question on the curve while the abscissa represents the position of that point in the system at a specific instant. The plot of FIG. 1 may be deemed indicative of the appearance of what the concentration gradients in a solid bed adsorptive system of a more selectively adsorbed component (component 1) and a less selectively adsorbed component (component 2) throughout a packed bed would be a given time after a slug of feed comprising a mixture of the components is introduced into the bed followed by a continuous flow of displacement fluid (desorbent) which is capable of effecting desorption of component 1 from the adsorbent. Components 1 and 2 separate at least partially because of the selective retention of component 1 resulting from the selective adsorption of component 1.

The above plot, as shown in FIG. 1, for purposes of the present invention, is divided into specific zones, as indicated.

Similar to Gerhold, the essence of the present invention lies in a unique process based on the plot of FIG. 1 which establishes the zones of FIG. 1 as a dynamic system in a series of separating units. Unlike Gerhold, however, there are inlet streams into the extract and raffinate zones. That is, at most only a portion of the extract and raffinate streams are withdrawn from the system, the remainder being passed to the inlets of the next units in the series so as to achieve interconnected serial flow. To complete the single closed loop as required by the invention, the outlet stream of the last unit of the series is passed to the inlet of the first unit.

Figure 2:
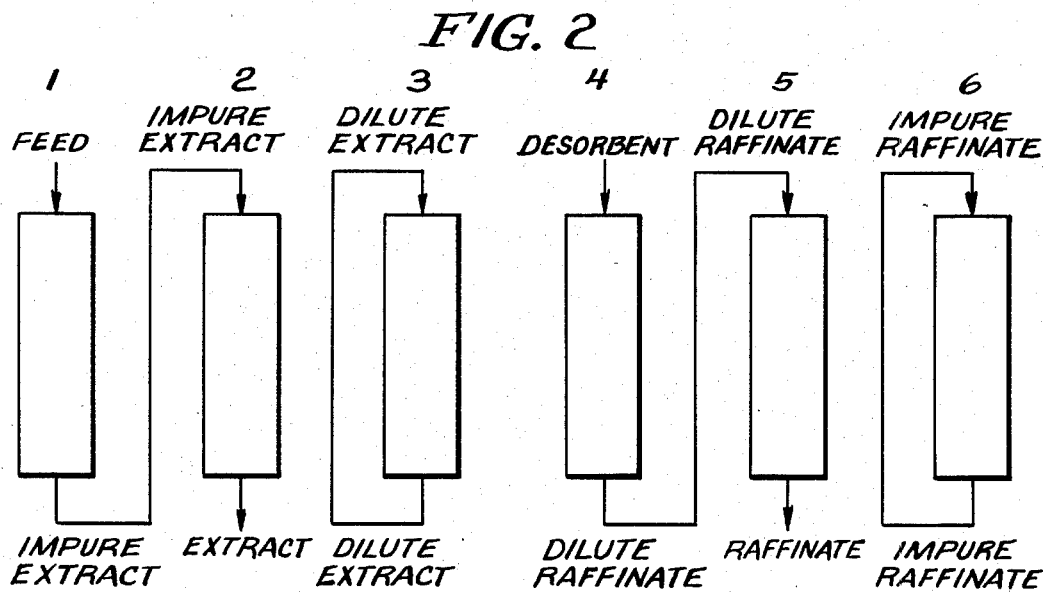
FIG. 2 is a flow diagram of the separating units of an embodiment of the Gerhold invention showing the various inlet and outlet streams and the location relationships of those streams for that embodiment.
Figure 3:
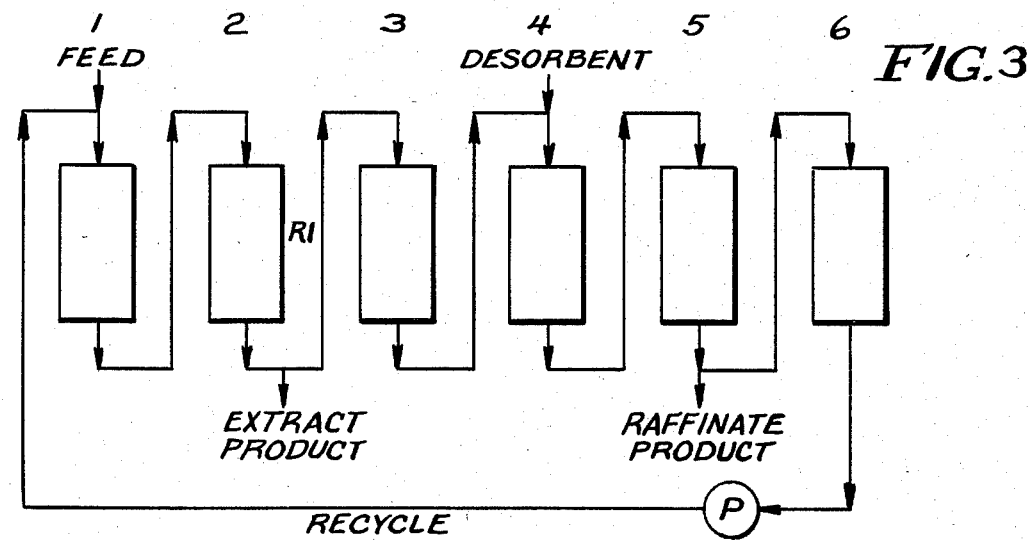
FIG. 3 is a flow diagram of the separating units of a particularly preferred embodiment of the present invention for the separation of two components.

The flow scheme of one embodiment of the present invention, that embodiment closest to the embodiment of the Gerhold invention shown in FIG. 2, is as shown in FIG. 3. The flow scheme of FIG. 3, like that of FIG. 2, incorporates six columns (separating units), although any number in excess of one could be used within the scope of the present invention. A further similarity between the flow schemes of FIGS. 2 and 3 is that the feed and desorbent streams are directed to the inlets of columns 1 and 4, respectively.

The primary differences between the flow schemes of FIGS. 2 and 3, the processes of Gerhold and that of the present invention, respectively, are quite apparent. First of all, the columns of FIG. 2 are interconnected in a manner which results in two separate closed loops and two series of two columns each which are not in closed loops, as opposed to the columns of FIG. 3 which are all interconnected in series with the last column effluent joining with the feed to the first column so as to obtain a single closed loop. Neither the feed nor desorbent streams of FIG. 2 are mixed with any other streams prior to passing through the inlets of columns 1 and 4, respectively, as opposed to the feed and desorbent streams of FIG. 3 which are mixed with the internal interconnecting streams to columns 1 and 4, respectively, prior to passage into those columns. Finally, but not the least important, extract and raffinate product streams in FIG. 2 comprise the entire streams from columns 2 and 5, respectively, whereas in FIG. 3, those product streams comprise only a portion of the effluent of columns 2 and 5, the remaining portions of such streams being passed into the next inlets in sequence.

One immediate advantage of the present invention as compared to Gerhold is a decoupling of the extract product withdrawal rate from the feedstream rate, thereby achieving a significantly increased flexibility of operation. Specifically, as apparent from FIG. 2, and basic material balance considerations, in Gerhold the feed and extract rates must be equivalent, as must be the desorbent and raffinate rates. No such equivalency is required by the present invention as apparent from the flow scheme of FIG. 3.

With further reference to FIG. 3, we may obtain the following equations by continuity from a simple mass balance:

1. $F + R2 = E + R1$; and
2. $F + D = E + R$;

where
$F$ = feed rate.
$R1$ = rate of the portion remaining of the stream from which the extract product is obtained.
$R2$ = rate of the stream combined with the feed stream to complete the closed loop.
$D$ = desorbent rate.
$E$ = extract product stream withdrawal rate.
$R$ = raffinate product stream withdrawal rate.

Thus, from the first equation we see that F and E may be completely independent of each other, since R1 and/or R2 may be varied to achieve a balanced equation. From the second equation we see that D and R may be completely independent of each other, since F and/or E (or indirectly R1 and/or R2) may be varied to achieve a balanced equation.

The flow scheme of the present invention probably requires two pumps, one to pump out the extract product stream, and the other to pump back R2 for mixture with the feed.

Another advantage of the present invention is the ability to maintain a high degree of continuity of the component concentration profiles throughout the units. This ability results from avoidance of disruptions to the profiles by direct introduction of feed and desorbent streams into the system and removal of the entire concentrated extract and raffinate streams from the system. A significant benefit of being able to maintain such continuity in the concentration profiles is that a higher average solids concentration in the product streams may be obtained.

It should be emphasized that the present invention enables the extract and raffinate product streams to be withdrawn from one or more of the streams between pairs of adjacent units. The point or points of product withdrawal will depend on the concentration or purity desired for the product stream in question.

The present invention has what is perhaps the unique capability in a simulated moving bed system of continuously separating three or more components present in a feed mixture. The rates of travel of each component in the separating units are presumed to be different and comprise a spectrum ranging from the rate of the most selectively retarded component to the rate of the least selectively retarded component. Each pair of components, the rates of travel of which are adjacent on the spectrum, is considered, as between such pair, an extract component and raffinate component for the most retarded and least retarded, respectively. There will be, therefore, a component concentration distribution for each such pair. The selection of the streams from which product streams are withdrawn will, of course, be consistent with the desired purity and concentration of each of the components, but there must be a sufficient number of separating units to enable the desired multicomponent separation, i.e. at least one unit for each component to be separated.

Optimum separation through use of the present invention depends on the coordination of the differential component movement rates through the separating units with the step or shift timing and the feed, withdrawal and inter-intra unit circulation rates. Thus, the flow rates of the fluid streams to the fluid inlets and from the fluid outlets are adjusted to provide the desired transition compositions of each inlet and outlet stream at the start and end of each flow period between each shift. The shifting of the inlets and outlets of the separating units would most advantageously be triggered by means of an on-stream analyzer which continuously monitors the composition of one or more of the product effluent streams and effects shifting upon one or more of the compositions reaching a predetermined optimum value.

The following illustrative embodiments I through IV are based on the embodiment of the present invention set forth in FIG. 3. Illustrative embodiments V through VIII are based on flow schemes similar to that of FIG. 3 except for the raffinate product being acquired from the outlet of column 4 in embodiment V, the extract acquired from column 1 and the raffinate from column 4 in embodiment VI, the extract from column 1 in embodiment VII, and the extract from column 3 in embodiment VIII. In embodiment IX, the flow scheme comprises four columns with feed to the first, desorbent to the third, extract from the second and raffinate from the third. The illustrative embodiments are based on computer simulations of the separation of fructose from an aqueous solution of fructose and glucose using separating units comprising columns packed with zeolitic adsorbent having selectivity for fructose. In all cases the feed comprises 22 wt. % fructose, 28 wt. % glucose and 50 wt. % water; and the desorbent comprises 100% water. Furthermore, plug flow through the columns is assumed in all cases, i.e., there is assumed to be no axial mixing. This assumption is deemed to be close to the actual expected flow characteristics of the fructose/glucose aqueous solutions and also enables a better comparison of the various cases. The adsorbent bed volume in each column is 385 cc, with 60% void volume and 12% pore volume. The selectivity of the fructose with respect to glucose is 6.0 and that of water with respect to glucose is 5.0.

The cycle time is the time for a given column or separating unit to complete one full cycle through all the zones. A cycle is broken up into steps of equal duration, in this case, therefore, ten minutes per step, the shifting of the various inlet and outlet streams occurring once at the end of each step. In all the following illustrations the cycle time is 60 minutes.

ILLUSTRATIVE EMBODIMENT I

For this illustration of the separation of fructose from an aqueous solution of fructose and glucose using the six vessel embodiment of the invention as shown in FIG. 3, the following flow rates (cc/min) apply:

| | |
|---|---|
| Feed/Extract | 5.08 |
| Desorbent/Raffinate | 6.00 |
| Column No. | |
| 1 | 6.47 |
| 2 | 6.47 |
| 3 | 1.39 |
| 4 | 7.39 |
| 5 | 7.39 |
| 6 | 1.39 |

Figure 4:
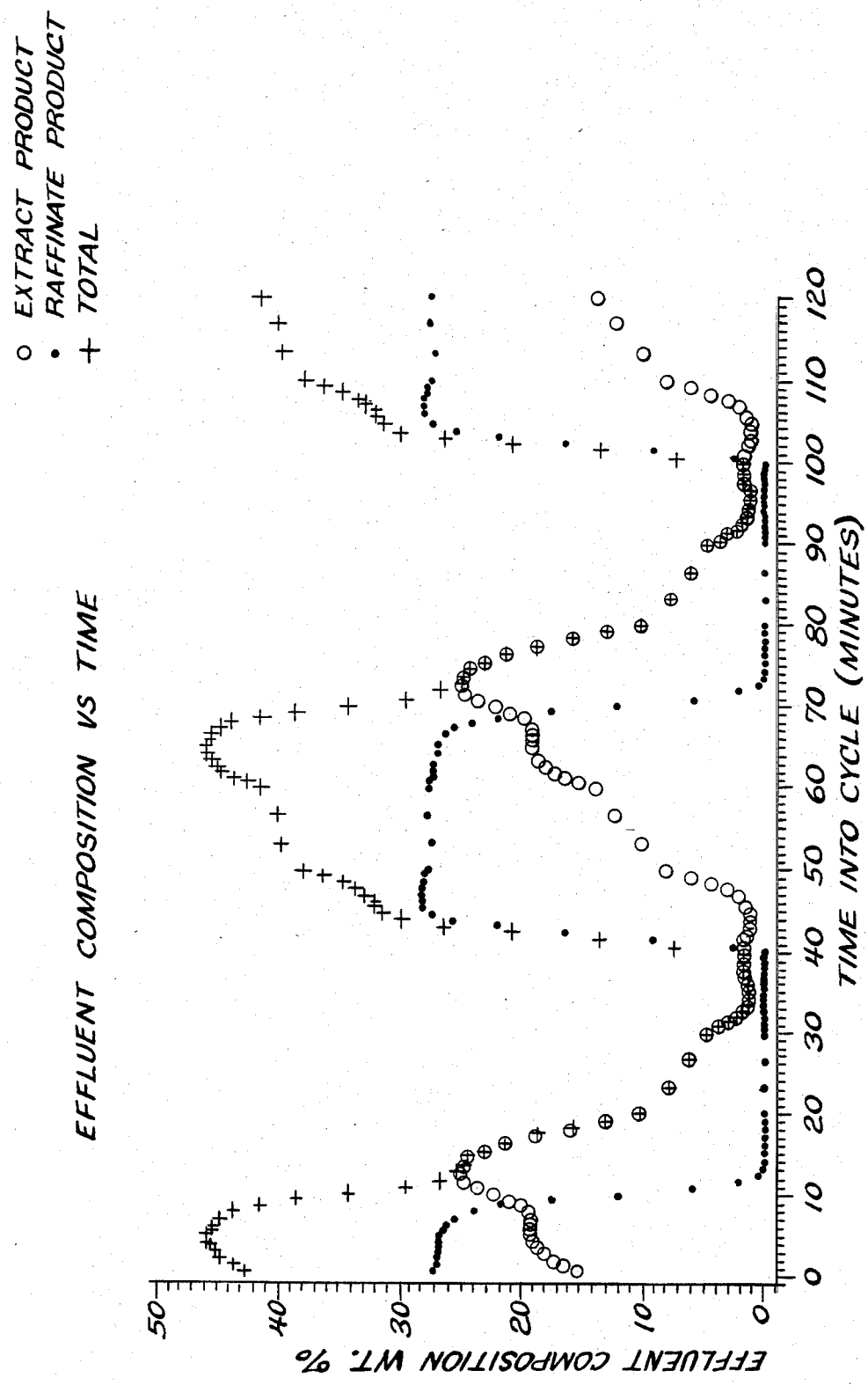
FIGS. 4 through 12 comprise graphical presentations of data obtained in computer simulations of the process of the present invention and are discussed hereinafter in greater detail in Illustrative Embodiments I through IX.

Effluent of one of the six columns throughout one full cycle is shown in FIG. 4. This particular column is in the column 1 position at the start of the cycle at which time its effluent comprises impure extract. Through the remainder of the cycle the column progresses sequentially to the 2, 3, 4, 5 and 6 positions.

The computed average extract purity on a desorbent-free basis is 96.0% and extract recovery via the extract output stream is 87.7%.

ILLUSTRATIVE EMBODIMENT II

This embodiment is identical to embodiment I except that the following flow rates (cc/min) apply:

| | |
|---|---|
| Feed/Extract | 5.08 |
| Desorbent/Raffinate | 6.00 |
| Column No. | |
| 1 | 6.93 |
| 2 | 6.93 |
| 3 | 1.85 |
| 4 | 7.85 |
| 5 | 7.85 |
| 6 | 1.85 |

Figure 5:
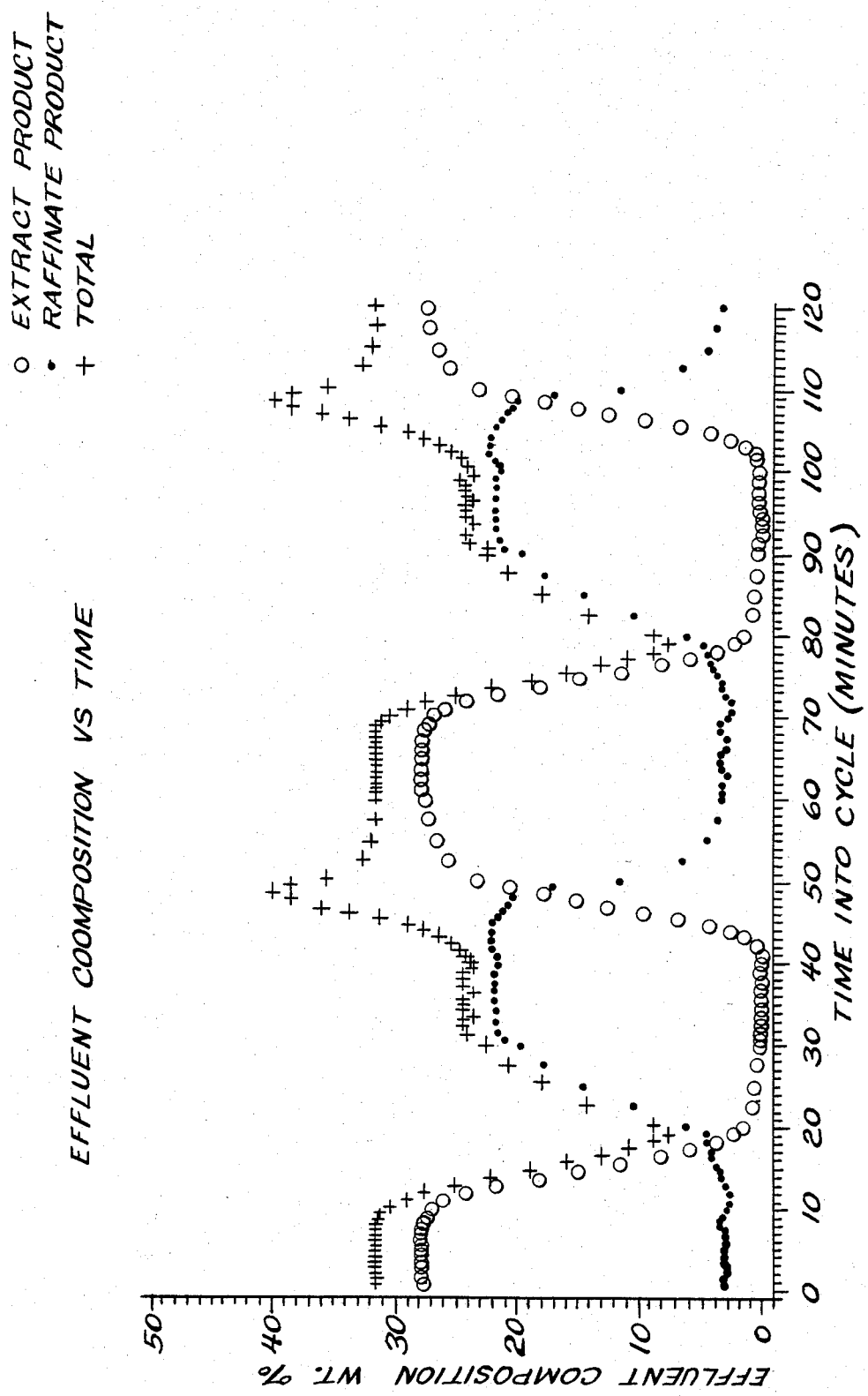

The effluent profiles are as shown in FIG. 5. The computed average extract purity on a desorbent-free basis is 73.8% and extract recovery via the extract output stream is 55.2%.

ILLUSTRATIVE EMBODIMENT III

This embodiment is identical to Embodiments I and II except that the following flow rates (cc/min) apply:

| | |
|---|---|
| Feed | 5.08 |
| Extract | 5.55 |
| Raffinate | 6.46 |
| Desorbent | 6.93 |
| Column No. | |
| 1 | 6.47 |
| 2 | 6.47 |
| 3 | 0.92 |
| 4 | 7.85 |
| 5 | 7.85 |
| 6 | 1.39 |

Figure 6:
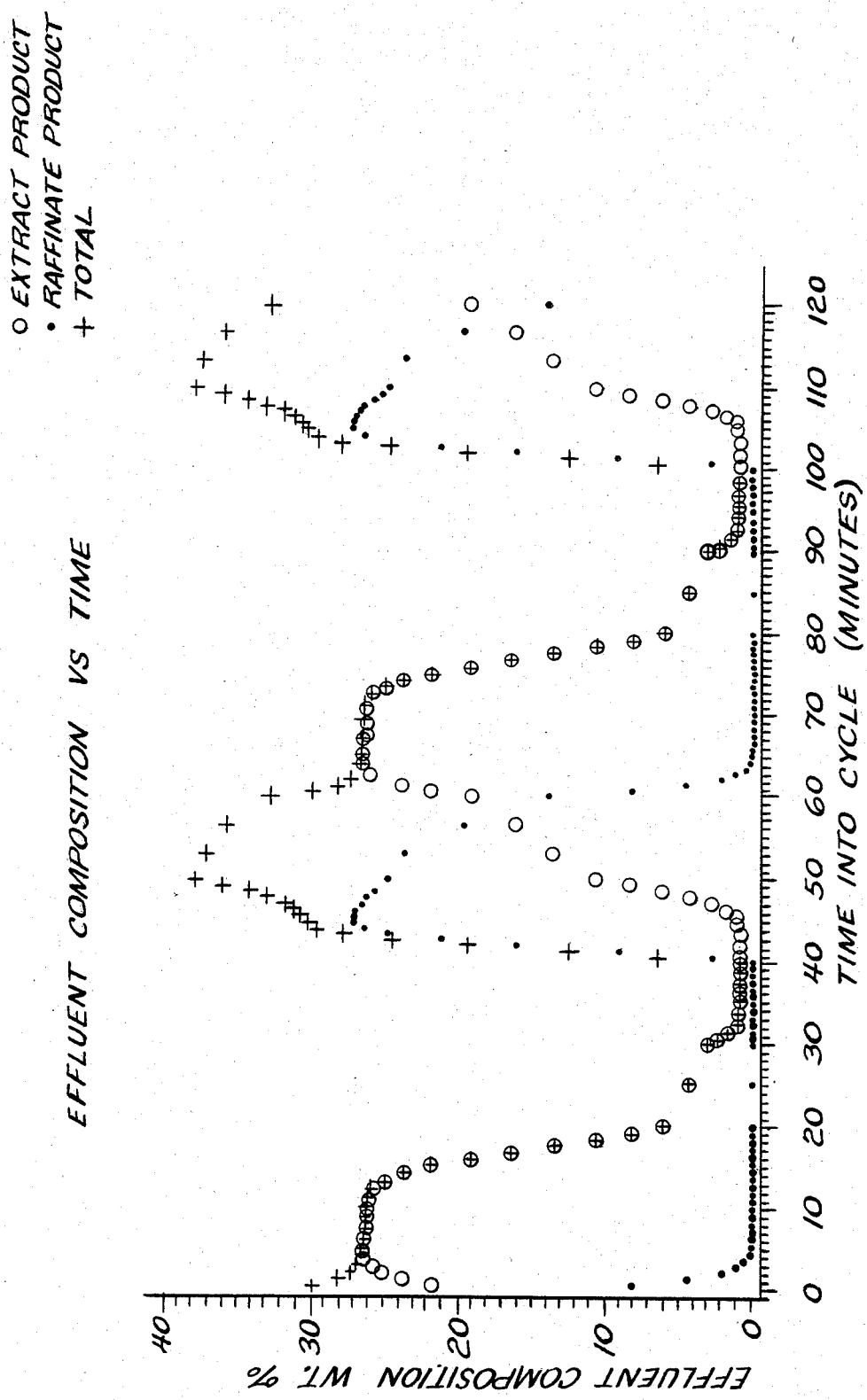

The effluent profiles are as shown in FIG. 6.

The computed average extract purity on a desorbent-free basis is 100.0% and extract recovery via the extract output stream is 85.2%.

ILLUSTRATIVE EMBODIMENT IV

This embodiment is identical to the prior embodiments except that the following flow rates (cc/min) apply:

| | |
|---|---|
| Feed/Extract | 5.08 |
| Raffinate/Desorbent | 5.08 |
| Column No. | |
| 1 | 6.93 |
| 2 | 6.93 |
| 3 | 1.85 |
| 4 | 6.93 |
| 5 | 6.83 |
| 6 | 1.85 |

Figure 7:
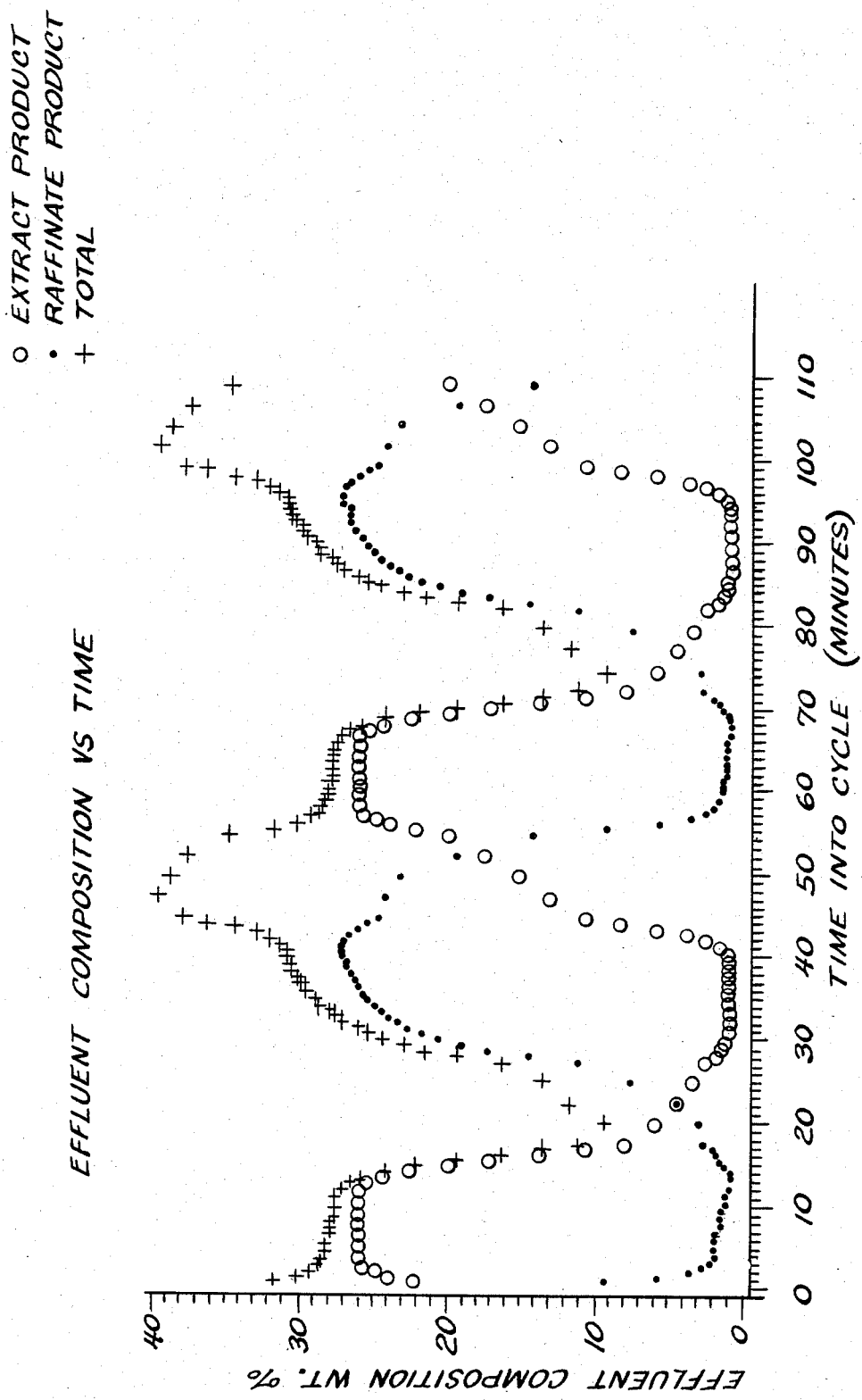

The effluent profiles are as shown in FIG. 7.

The computed average extract purity on a desorbent-free basis is 91.0% and extract recovery via the extract output stream is 84.9%.

ILLUSTRATIVE EMBODIMENT V

This embodiment is identical to the prior embodiments except that the raffinate product stream is obtained from the column 4 effluent stream, and that the following flow rates (cc/min) apply:

| | |
|---|---|
| Feed/Extract | 5.08 |
| Desorbent/Raffinate | 6.01 |
| Column No. | |
| 1 | 7.85 |
| 2 | 7.85 |
| 3 | 2.77 |
| 4 | 8.78 |
| 5 | 2.77 |
| 6 | 2.77 |

Figure 8:
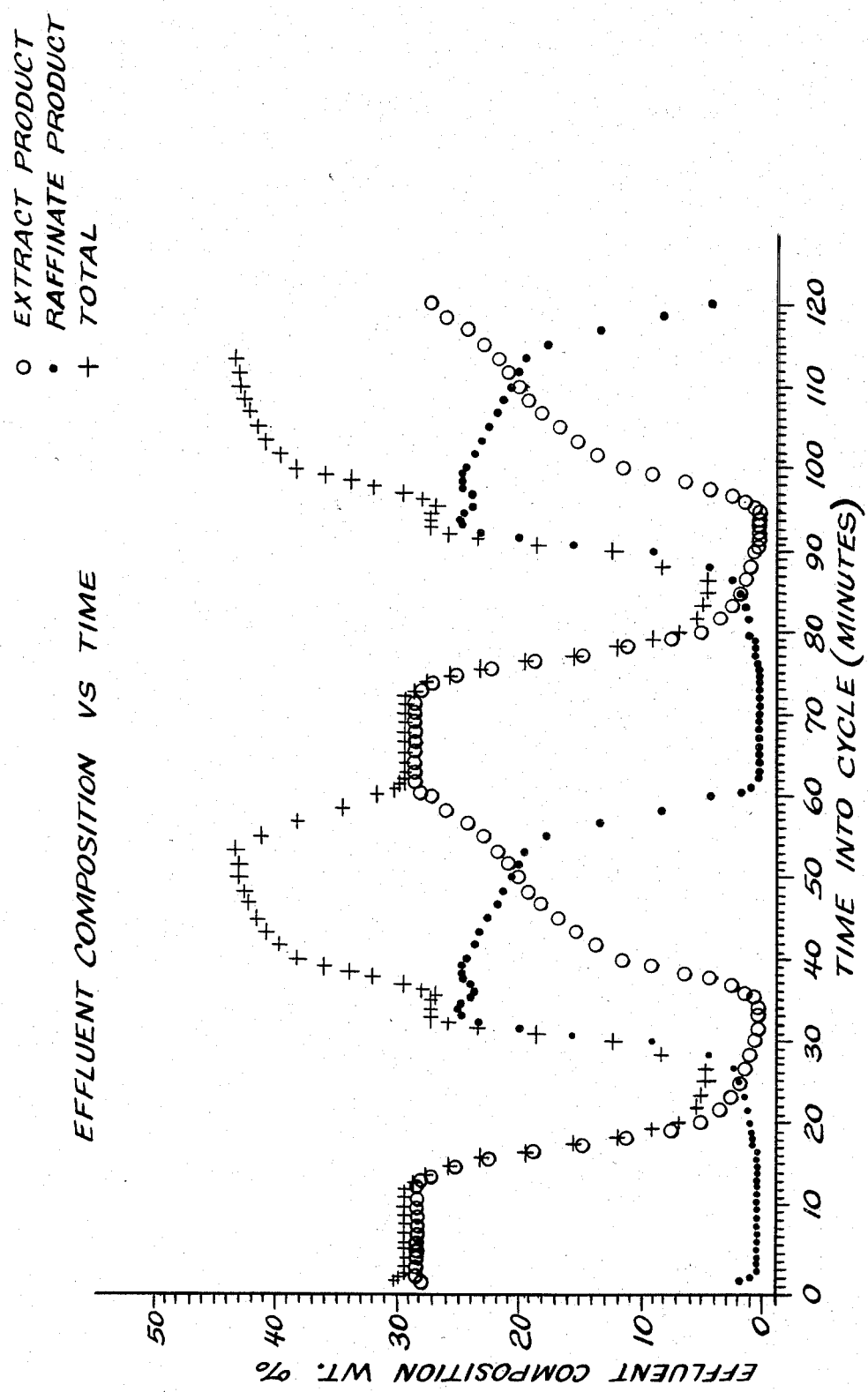

The effluent profiles are as shown in FIG. 8.

The computed average extract purity on a desorbent-free basis is 95.3% and extract recovery via the extract output stream is 83.5%.

ILLUSTRATIVE EMBODIMENT VI

This embodiment is identical to illustrative Embodiment V except that the extract product stream is obtained from the column 1 effluent stream, and that the following flow rates (cc/min) apply:

| | |
|---|---|
| Feed/Extract | 5.08 |
| Desorbent/Raffinate | 6.00 |
| Column No. | |
| 1 | 8.78 |
| 2 | 3.70 |
| 3 | 3.70 |
| 4 | 9.70 |
| 5 | 3.70 |
| 6 | 3.70 |

Figure 9:
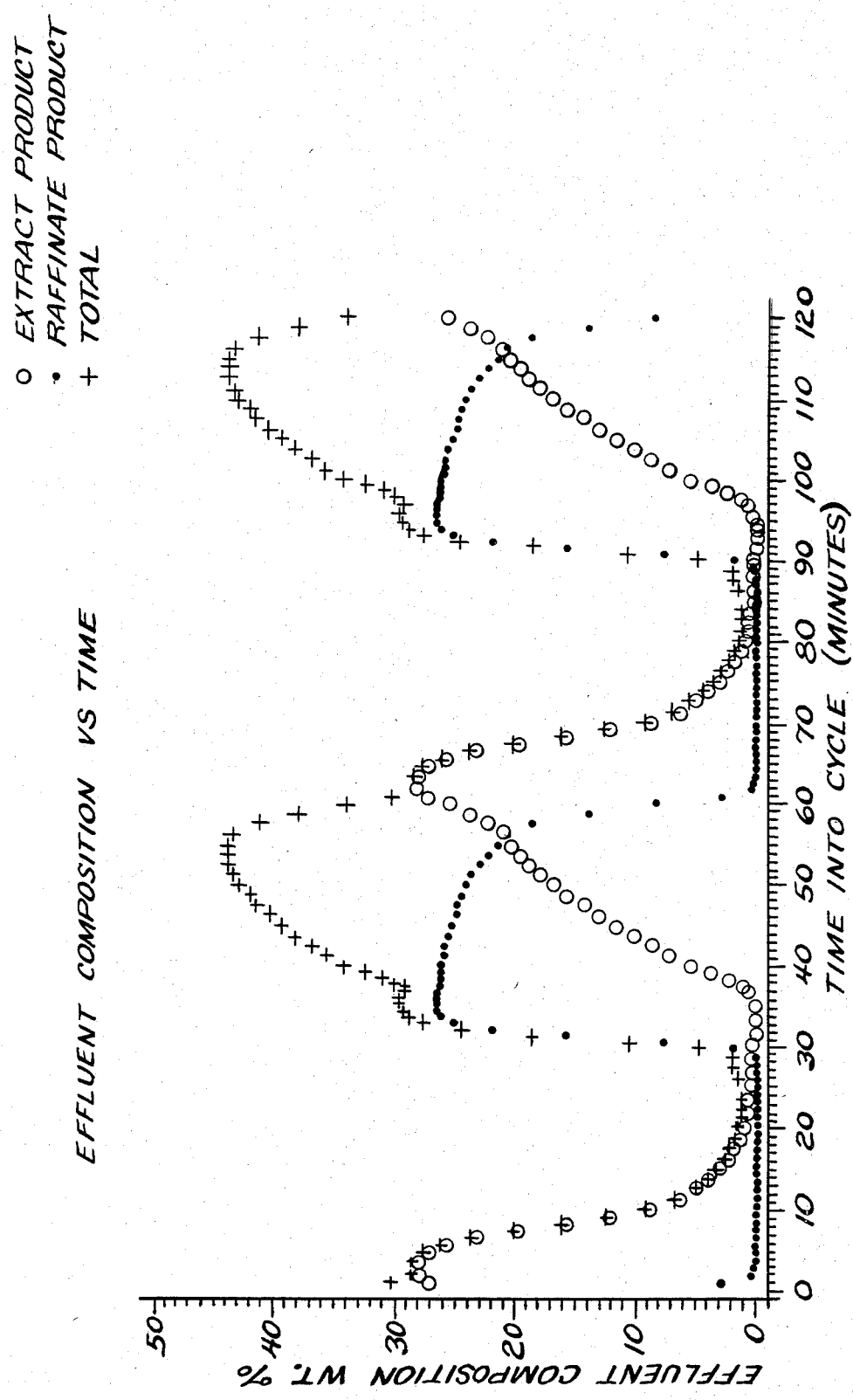

The effluent profiles are as shown in FIG. 9.

The computed average extract purity on a desorbent-free basis is 97.4% and extract recovery via the extract output stream is 96.2%.

ILLUSTRATIVE EMBODIMENT VII

This embodiment is identical to Illustrative Embodiment VI except that the raffinate product stream is obtained from the column 5 effluent stream, and that the following flow rates (cc/min) apply:

| Feed | 5.08 |
|---|---|
| Extract | 4.62 |
| Desorbent | 5.55 |
| Raffinate | 6.01 |
| Column No. | |
| 1 | 7.39 |
| 2 | 2.77 |
| 3 | 2.77 |
| 4 | 8.32 |
| 5 | 8.32 |
| 6 | 2.31 |

Figure 10:
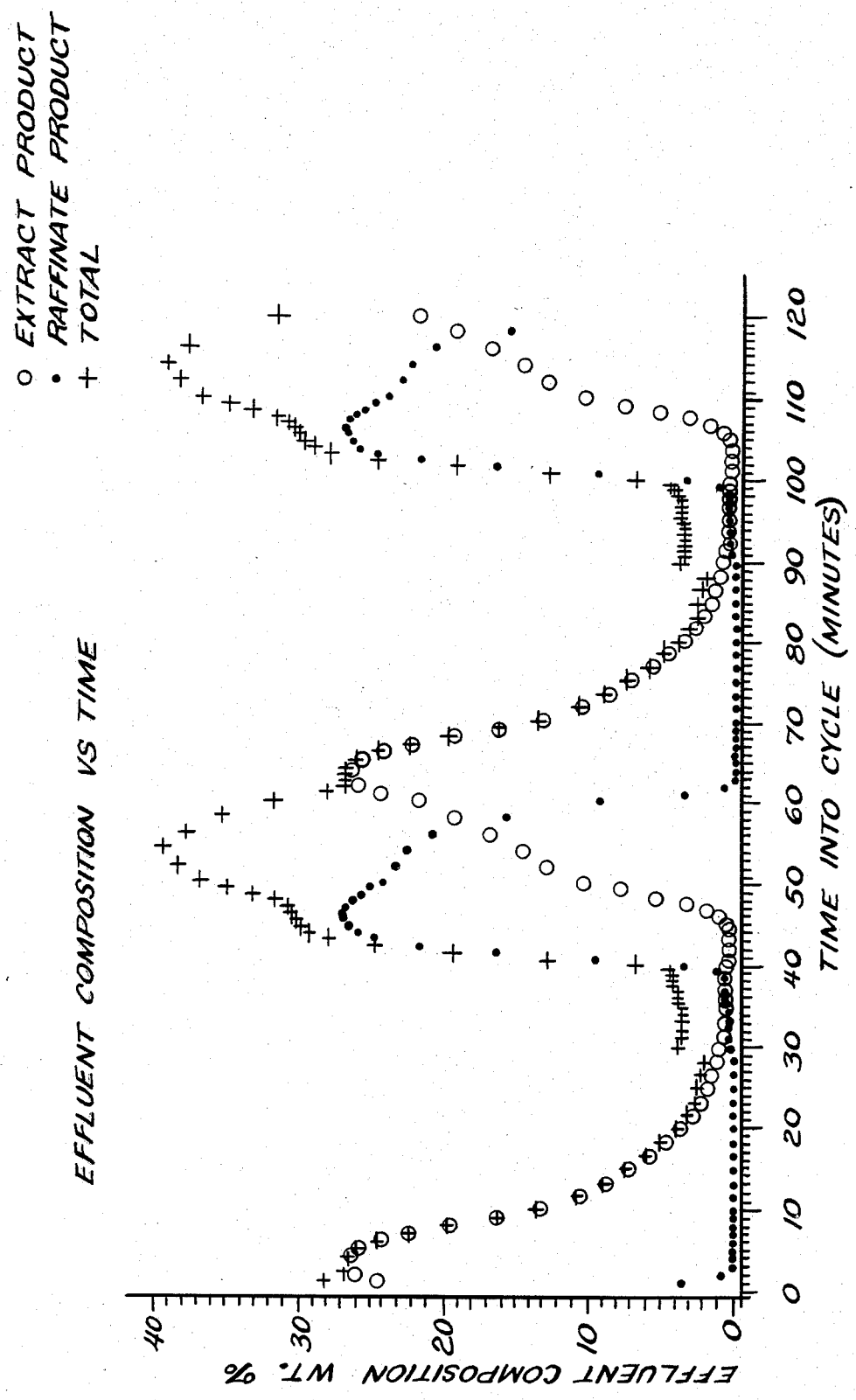

The effluent profiles are as shown in FIG. 10.

The computed average extract purity on a desorbent-free basis is 97.2% and extract recovery via the extract output stream is 95.5%.

ILLUSTRATIVE EMBODIMENT VIII

This embodiment is identical to Illustrative Embodiment VII except that the extract product stream is obtained from the column 3 effluent stream, and that the following flow rates (cc/min) apply:

| Feed/Extract | 5.08 |
|---|---|
| Desorbent/Raffinate | 6.01 |
| Column No. | |
| 1 | 5.54 |
| 2 | 5.54 |
| 3 | 5.54 |
| 4 | 6.47 |
| 5 | 6.47 |
| 6 | 0.46 |

Figure 11:
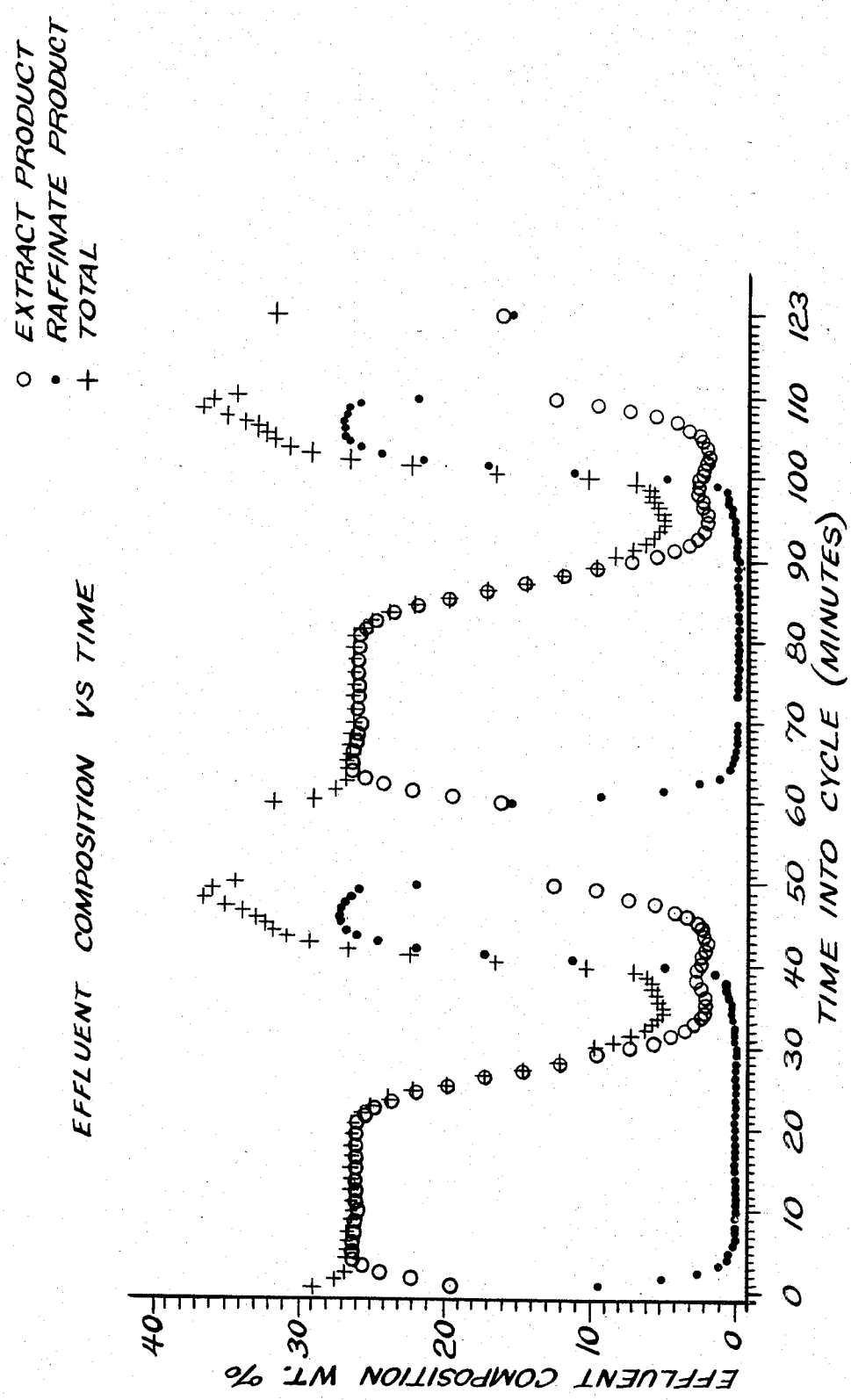

The effluent profiles are as shown in FIG. 11.

The computed average extract purity on a desorbent-free basis is 98.8% and extract recovery via the extract output stream is 76.9%.

ILLUSTRATIVE EMBODIMENT IX

This embodiment is a departure from the previous embodiments in that in this case only four columns are used with extract and raffinate product streams obtained from the second and third columns, respectively. The following flow rates (cc/min) apply:

| Feed/Extract | 3.39 |
|---|---|
| Desorbent/Raffinate | 4.00 |
| Column No. | |
| 1 | 6.47 |
| 2 | 6.47 |
| 3 | 7.08 |
| 4 | 3.08 |

Figure 12:
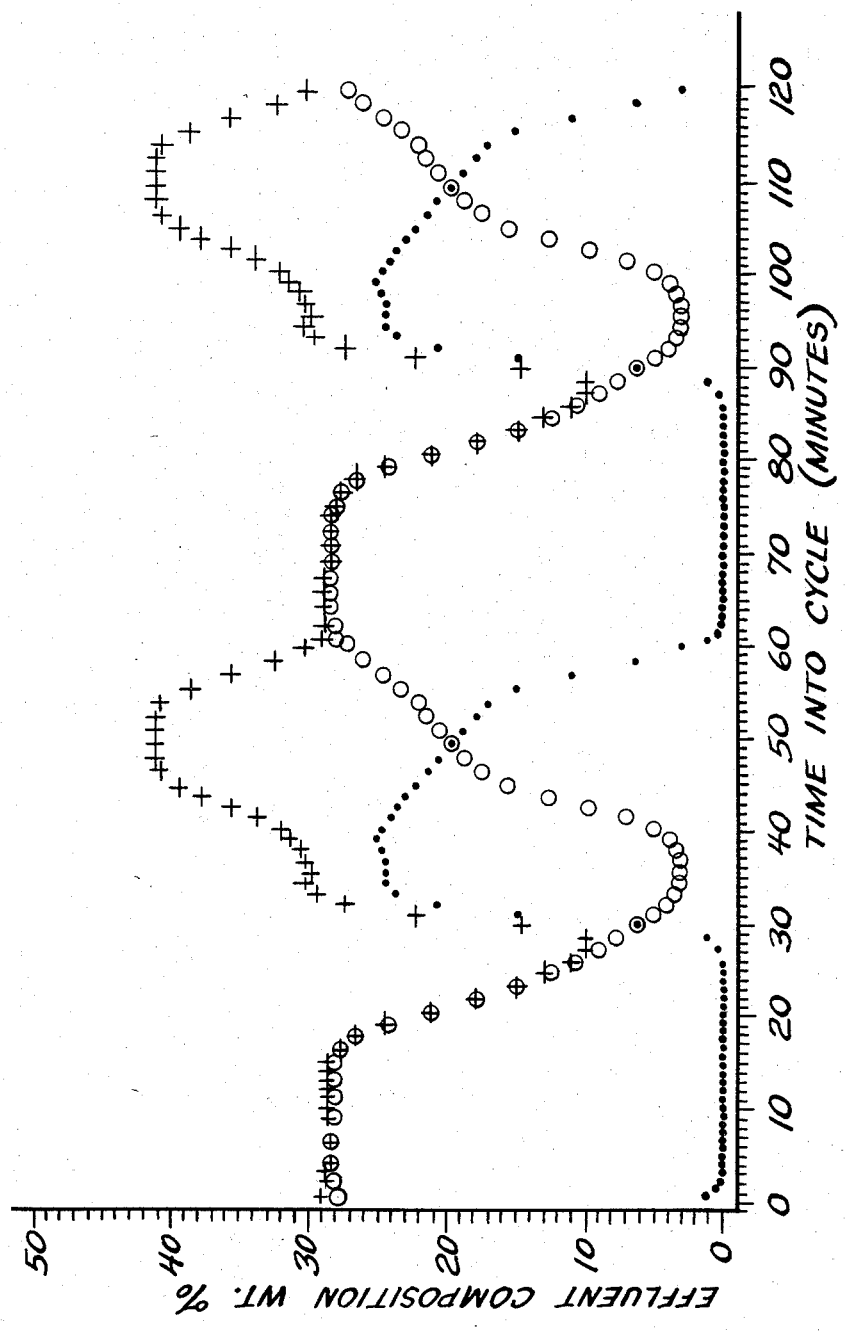

The effluent profiles are as shown in FIG. 12.

The computed average extract purity on a desorbent-free basis is 93.4% and extract recovery via the extract output stream is 65.5%.

Perusal of the above illustrative embodiments reveals a remarkable flexibility in the process of the present invention. The decoupling of the feed from extract and desorbent from raffinate streams enables results such as those achieved in Illustrative Embodiments III and VII, where in the former, 100% extract purity is obtained with very high recovery, and in the latter, 95.5% extract component recovery is realized with very high purity. Changing the stream from which extract product is obtained and carefully optimizing the column flow rates may produce results as in Illustrative Embodiment VI which realizes very high purity and recovery. Finally, as shown in Illustrative Embodiment IX, significant savings in capital investment may be achieved by reducing the number of columns, but still obtaining product at a purity and recovery which may be acceptable under the particular circumstances.

I claim as my invention:

1. A process for separating an extract component from a raffinate component contained in a feed mixture comprising the steps of:

(a) maintaining a unidirectional fluid flow system through a series of separating units in which said components have differential rates of travel due to selective retardation or acceleration of each of said components in each of said units, each of said units having a fluid inlet and a fluid outlet, said separating units being interconnected so as to achieve serial flow through said units in a single closed loop;

(b) mixing said feed mixture with the fluid emanating from one of said fluid outlets and passing the resultant first mixture into the next inlet downstream of said outlet in said series and mixing said displacement fluid with the fluid emanating from another of said fluid outlets and passing the resultant second mixture into the next inlet downstream of said other outlet in said series;

(c) establishing within said separating units a component concentration distribution, zones of which comprise, sequentially, progressing in the direction of fluid flow, extract and raffinate component mixture with the proportion of the raffinate component to extract component being greater than in the feed mixture, extract and raffinate component mixture with the proportion of extract component to raffinate component being greater than in the feed mixture, concentrated extract component, extract component diluted with displacement fluid, raffinate component diluted with displacement fluid, and concentrated raffinate component;

(d) withdrawing as an extract product stream a portion of at least one of the streams between an adjacent pair of separating units, and withdrawing as a raffinate product stream a portion of at least one other of the streams between a different adjacent pair of separating units, the selection of the streams from which said product streams are withdrawn being consistent with the desired composition of each of said product streams;

(e) periodically simultaneously advancing in an upstream direction with respect to fluid flow in said separating units, all of said inlets and outlets to effect the shifting of zones in a downstream direction with respect to said fluid flow, said shifting being effected prior to the progression through said units of said component concentration distribution to the extent that the composition of the inlet or outlet streams to or from any zone becomes inconsistent with the desired composition of that zone.

2. The process of claim 1 wherein the flow rates of the fluid streams to said fluid inlets and from said fluid outlets are adjusted to provide the desired transition compositions of each inlet and outlet stream at the start and end of each flow period between said shifting.

3. The process of claim 1 wherein said separating units comprise columns at least partially packed with adsorbent having adsorptive selectivity for said extract component as compared to said raffinate component, said displacement fluid comprising a desorbent capable of effecting desorption of said extract component from said adsorbent, said first mixture of step (b) being contacted with said adsorbent at adsorption conditions and said second mixture of step (b) being contacted with said adsorbent at desorption conditions.

4. The process of claim 3 wherein said fluid flow system is in liquid phase and said adsorption and desorption conditions comprise temperatures and pressures which effect said liquid phase.

5. The process of claim 1 wherein there are three or more components in said feed mixture, the rates of travel of which in said units are all different and which comprise a spectrum ranging from the rate of the most selectively retarded component to the rate of the least selectively retarded component, each pair of components having adjacent rates of travel on said spectrum being considered, as between said pair, an extract component and raffinate component for the most retarded and least retarded, respectively, there being a component concentration distribution as in step (c) for each such pair, the selection of the stream from which product streams are withdrawn in step (d) being consistent with the desired purity and concentration of each of said components.

6. The process of claim 5 wherein there is at least one separating unit for each component to be separated.

* * * * *